United States Patent Office 3,828,053
Patented Aug. 6, 1974

3,828,053
LOWER-ALKYL-β-OXO-4-PIPERIDINE-N-BENZOYLPROPIONATES
Felix E. Granchelli, Arlington, Mass., assignor to Beecham Group Limited, Brentford, England
No Drawing. Continuation of abandoned application Ser. No. 873,080, Oct. 31, 1969. This application Aug. 17, 1971, Ser. No. 172,582
Int. Cl. C07d 29/24
U.S. Cl. 260—293.77     2 Claims

ABSTRACT OF THE DISCLOSURE

Benzopyran-5-ols having anti-depressant and analgesic properties are prepared from corresponding coumarin intermediates via the new β-keto ester ethyl-β-oxo-4-piperidine-N-benzoylpropionate obtained from N-benzoyl-isonipecotinyl tert. butyl ethyl malonate. The benzopyran-5-ols can be hydrogenated to the corresponding pyran ring-saturated dihydro-pyrans lacking the double bond in the 3–4 position.

---

This application is a continuation of Ser. No. 873,080, filed Oct. 31, 1969, now abandoned.

This invention relates to a process for the preparation of the compounds and coumarin intermediates therefor described in the application of Raj K. Razdan and William R. Thompson, Ser. No. 873,079, filed concurrently herewith, which compounds are useful as psychotropic agents for anti-depressant and anti-anxiety use and as pain relieving analgesics and the intermediates for such pharmacodynamic compounds. The present invention also includes certain new compounds which are intermediates for the coumarins and the preparation thereof.

The process hereinafter described and claimed resulted from the inability of any process known in the art, or any variation which would occur to one of ordinary skill, to produce the said new coumarins and benzopyrans of the said Razdan and Thompson invention and consequently the present process had to be especially devised for the present purpose. In particular, the preparation of the keto intermediate, ethyl-β-oxo-4-piperidine-N-benzoylpropionate (described hereinafter) must be protected with an electron-withdrawing group, as otherwise the keto ester cannot be prepared. For example, where N-H or N-alkyl was used in place of N-benzoyl the synthesis of the keto ester did not work.

The procedure in its particular form is as follows, the other Razdan and Thompson compounds being prepared in similar manner:

(I) PREPARATION OF ETHYL TERT.-BUTYL MALONATE

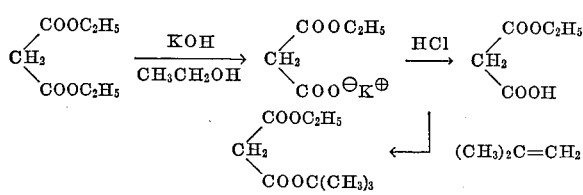

The procedure of Breslow, Baumgarten, and Hauser [J. Am. Chem. Soc., 66, 1286 (1944)] was followed to make the ethyl hydrogen malonate.

To a solution of 1,025.1 g. (6.4 moles) of diethylmalonate (dried over Drierite) in 4100 ml. of absolute alcohol was added 359.1 g. (6.4 moles) of potassium hydroxide in 4100 ml. of absolute alcohol over 2.5 hrs. The mixture was allowed to stand overnight at room temperature. It was heated to reflux in the morning and filtered hot through a pre-heated sinter-glass funnel to remove the di-potassium salt. The filtrate was cooled and the crystalline mono-potassium salt was filtered and dried in vacuo. The filtrate was taken down to a low volume on a rotary evaporator to yield a second crop of the mono-potassium salt. The weight of the combined crops was 838 g.

The salt was dissolved in 1200 ml. of water and treated with 430 ml. of concentrated hydrochloric acid to pH 1. Extraction with ether and subsequent evaporation yielded 480.2 g. (57%) of ethyl hydrogen malonate as a pale yellow oil.

The procedure described by Strube, "Organic Synthesis," Coll. Volume IV, 417 (1963) was followed to prepare the ethyl tert.-butyl malonate from ethyl hydrogen malonate.

To a solution of 250 ml. of ether and 15.6 ml. of concentrated sulfuric acid in a pressure bottle, cooled in an ice-salt bath, was added 314 ml. (3.31 moles) of isobutylene and 242.6 g. (1.84 moles) of ethyl hydrogen malonate. The closed system was shaken at room temperature overnight. The system was vented in the morning and the solution was poured into 126 g. of sodium hydroxide in 375 ml. of water and 375 g. of ice. The system was extracted with ether and evaporated in vacuo to give a near-colorless oil. The oil was distilled at 21 mm. over $K_2CO_3$ (100°). 254 g. of pure ethyl tert.-butyl malonate was isolated.

(II) PREPARATION OF N-BENZOYLISONIPECOTIC ACID

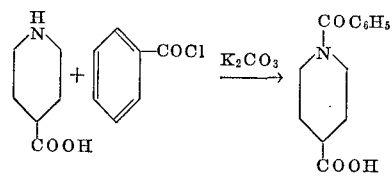

The procedure described by De Graw, et al., J. Het. Chem., 3(1), 67–9 (1966) was followed. To a solution of 195 g. (1.5 moles) of isonipecotic acid and 390 g. of $K_2CO_3$ in 3 liters of water, cooled to 5°, was added 175.8 ml. (1.5 mole) of benzoyl chloride over 20 min. After stirring at 5° for 30 minutes and at room temperature overnight, the solution was acidified to pH 1 with 800 ml. of 6N hydrochloric acid. Extraction with methylene chloride and evaporation of the solvent gave a white solid. Recrystallization from hot benzene and cyclohexane gave 270 g. (77%) of the product, m.p. 128–131°.

(III) PREPARATION OF N-BENZOYLISONIPECOTINYL TERT.-BUTYL ETHYL MALONATE

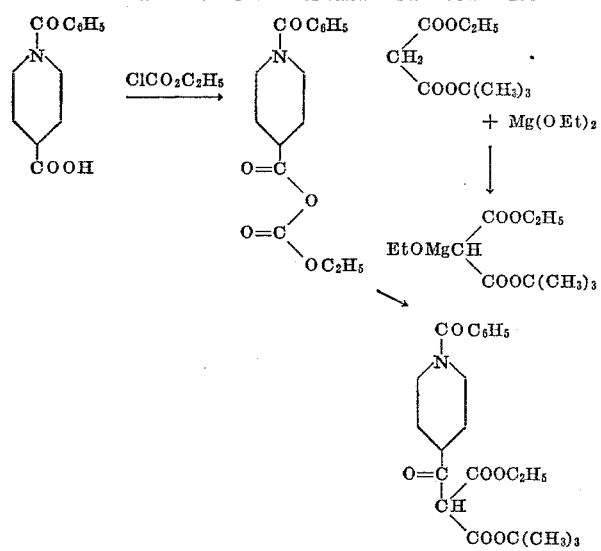

To a two-liter flask equipped with stirrer, condenser, drying tube, dropping funnel, and nitrogen line (which had been flame-dried) was added 61.8 g. (0.54 mole) of magnesium ethoxide (prepared from magnesium powder and absolute ethanol in xylene at 85°) and 500 ml. of dry ether. To the stirring slurry was added 101.6 g. (0.54 mole) of ethyl tert.-butyl malonate over 25 minutes. Reflux was continued for 1 hour and then the ether was removed on the water aspirator. Two hundred ml. of dry benzene was added and removed initially on the water aspirator and finally on the vacuum pump.

Simultaneously, to a two-liter flask equipped with stirrer, thermometer, drying tube, dropping funnel, and nitrogen line (which had been flame-dried) was added 126.6 g. (0.54 mole) of N-benzoylisonipecotic acid, 75.2 ml. of triethylamine (distilled from KOH), and 800 ml. of dry toluene. The mixture was cooled to 0–5° and 58.3 g. (0.54 mole) of ethyl-chloroformate was added over 20 minutes. The reaction mixture was stirred an additional 30 minutes at 0–5° and then the dry ethoxy-magnesioethyl-tert.-butyl malonate in 300 ml. of dry ether and 150 ml. of dry benzene was added over 20 minutes. The mixture was then stirred at 0–5° for 1.5 hours. It was stirred in 1 liter of water for 20 minutes and then the white solid was filtered and washed copiously with water, followed by ether. The solid was partitioned between 1500 ml. of ether and 1400 ml. of 2N sulfuric acid while being cooled in an ice-bath. After stirring for 15 minutes, the two phases were separated and the aqueous phase was extracted with ether. The combined ether phases were washed with water to neutrality, dried over anhydrous magnesium sulfate, and evaporated *in vacuo*. The product remained as a yellow oil, 137.2 g. (63%).

(IV) PREPARATION OF ETHYL-β-OXO-4-PIPERIDINE-N-BENZOYLPROPIONATE

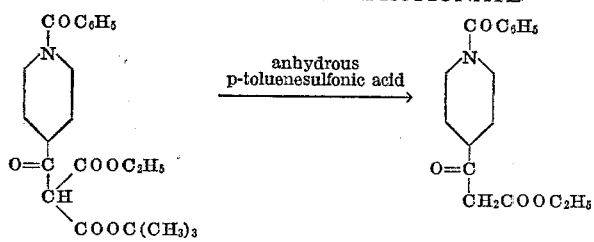

To a solution of 137.2 g. of the diester in 600 ml. of dry benzene was added ~24 g. of anhydrous p-toluenesulfonic acid (dried by azeotropic removal of the water with toluene immediately prior to use). The solution was refluxed for 2 hours and was then cooled and washed consecutively with water, potassium bicarbonate solution, and again with water. Drying over anhydrous magnesium sulfate and evaporation yielded a near-colorless oil, 100.8 g. (98%).

The above ethyl-β-oxo compound can also be the corresponding methyl-β-oxo compound or lower-alkyl-β-oxo compounds, although the ethyl compound is preferred.

(V) PREPARATION OF 4-(1-BENZOYL-4-PIPERIDINYL)-5-HYDROXY-7-PENTYLCOUMARIN

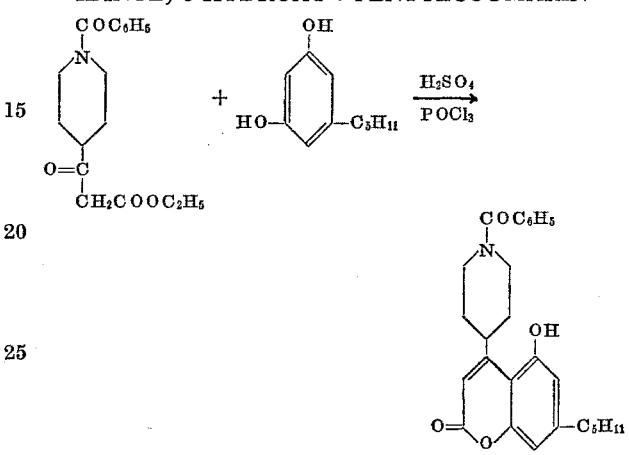

To a mixture of 70.3 g. (0.23 mole) of the β-keto ester and 41.46 g. (0.23 mole) of olivetol, being cooled in an ice-bath, was added 171.5 ml. of concentrated sulfuric acid over 2 hours and then 103 ml. of phosphorous oxychloride all at once. The mixture was stirred at room temperature for 2 days. It was then poured, with caution, onto ice while being cooled in an ice-bath. The aqueous phase was decanted from the insoluble yellow gum. The gum was triturated with potassium bicarbonate solution to pH 8. The aqueous phase was decanted and the gum was partitioned between methylene chloride and aqueous potassium bicarbonate to pH 8. The aqueous phase was extracted with methylene chloride. Drying and evaporation of the solvent yielded a dark yellow foam which, upon trituration with *cold* absolute alcohol, formed a white solid, m.p. 216–219°, 17.8 g. (18.5%).

*Analysis.*—Calcd. for $C_{26}H_{29}NO_4$: C, 74.44; H, 6.97; N, 3.34. Found: C, 74.50; H, 6.70; N, 3.49.

(VI) PREPARATION OF 2,2-DIMETHYL-7-PENTYL-4-(4-PIPERIDINYL)-2H-1-BENZOPYRAN-5-OL

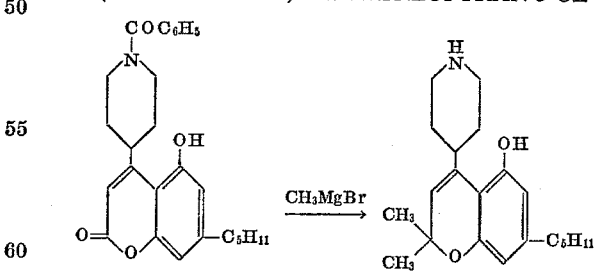

The Grignard reagent was prepared from 10.9 g. (0.45 mole) of magnesium turnings in 500 ml. of ether. Approximately 400 ml. of ether was then distilled out and replaced with 300 ml. of dry benzene. The flask was cooled and 12.8 g. (0.03 mole) of the coumarin was added all at once. The mixture was stirred at 55–60° for 3 days under a nitrogen atmosphere. The excess Grignard was then destroyed with ammonium chloride solution. Methylene chloride was added and the system was stirred while being acidified with 4N sulfuric acid. The aqueous phase was extracted with methylene chloride. Drying and evaporation of the solvent gave a dark residue which was heated at 110° for 2 hours in 100 ml. of acetic acid. Upon cooling, the reaction mixture was poured into 1200 ml.

of water and neutralized with solid sodium carbonate to pH 8. Exaraction into ether and subsequent drying and evaporation of the solvent gave a brown residue which, upon treatment with acetonitrile, formed a beige solid, m.p. 197–199°, 2.8 g. (28%).

(VII) PREPARATION OF 2,2-DIMETHYL-7-PENTYL-4-[1-(2-PROPYNYL) - 4 - PIPERIDYL]-2H-1-BENZOPYRAN-5-OL

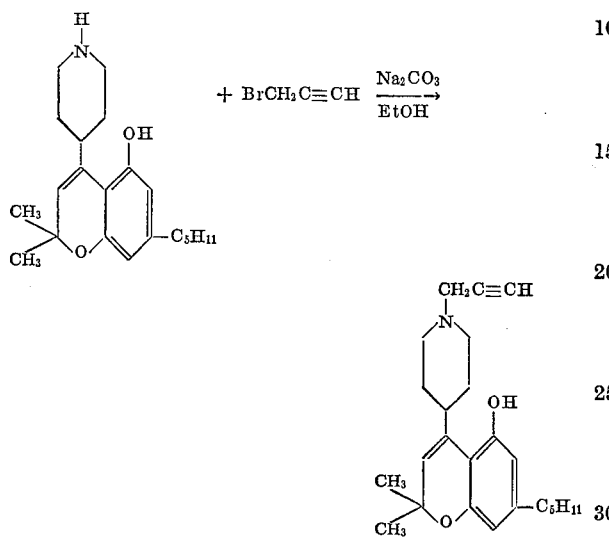

A mixture of 1 g. (0.003 mole) of the nor base, 70 ml. of absolute alcohol, 0.41 g. (0.003 mole) of anhydrous sodium carbonate, and 0.36 g. (0.003 mole) of freshly distilled propargyl bromide was heated at 50° for 2 hours and at 80–85° for 15 hours. The solution was cooled and filtered and the filtrate was evaporated to dryness. The residue was extracted with 20 ml. of boiling acetonitrile and the extract filtered hot and cooled in the freezer. A small amount of dark, gummy material precipitated out. The light, yellow solution was decanted off and stored in the freezer for an additional time to give 484 mg. (44%) of a yellow crystalline solid, m.p. 152°. 50 mg. recrystallized again from 2.8 ml. of acetonitrile gave 31 mg. of the product, m.p. 153–155°.

Analysis.—Calcd. for $C_{24}H_{33}NO_2$: C, 78.43; H, 9.05; N, 3.81. Found: C, 78.21; H, 9.07; N, 4.31.

(VIII) PREPARATION OF 4-(1-ALLYL - 4 - PIPERIDYL)-2,2-DIMETHYL - 7 - PENTYL-2H-1-BENZOPYRAN-5-OL

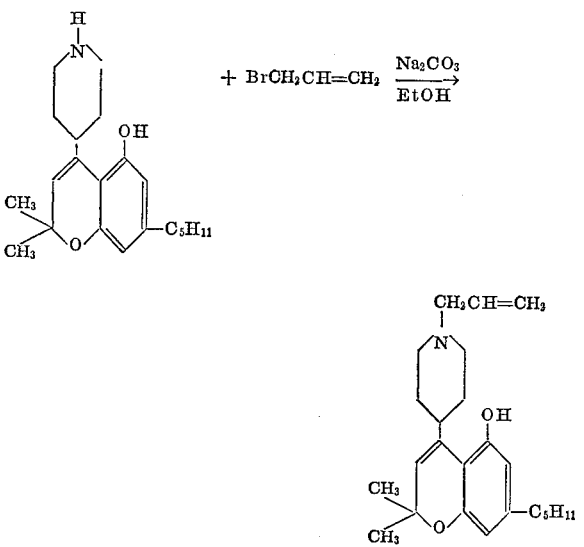

As with the propargyl derivative a mixture of 1 g. (0.003 mole) of the nor base, 40 ml. of absolute alcohol, 0.41 g. (0.003 mole) of anhydrous sodium carbonate, and 0.36 g. (0.003 mole) of allyl bromide was heated with stirring at 65° overnight. The mixture was worked up as before and the crude material was recrystallized from acetonitrile. After passage through a "Florosil" column with methanol and again recrystallized from acetonitrile, 341 mg. (31%) of the desired allyl derivative was obtained, m.p. 118°.

Analysis.—Calcd. for $C_{24}H_{35}NO_2$: C, 78.00; H, 9.55; N, 3.79. Found: C, 78.10; H, 9.53; N, 3.89.

(IX) PREPARATION OF 2,2-DIMETHYL-7-PENTYL-4-[1-(2-PHENYLETHYL)-4-PIPERIDYL] - 2H - 1-BENZOPYRAN-5-OL

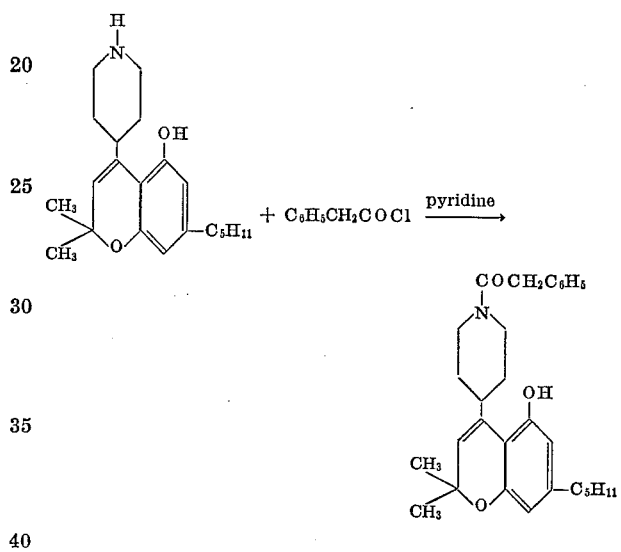

A solution of 0.47 g. (0.003 mole) of phenyl acetyl chloride in 7 ml. of dry benzene was added dropwise with stirring to a solution of 1 g. (0.003 mole) of the nor base in 7 ml. of dry pyridine and 5 ml. of dry benzene. The mixture was refluxed for 3 hours, cooled and evaporated to dryness. The residue was diluted with water and extracted with dichloromethane. The extract was washed with water and then with saturated aqueous sodium chloride. It was dried over sodium sulfate and evaporated to dryness. The resulting amide was used directly without further purification in the next step.

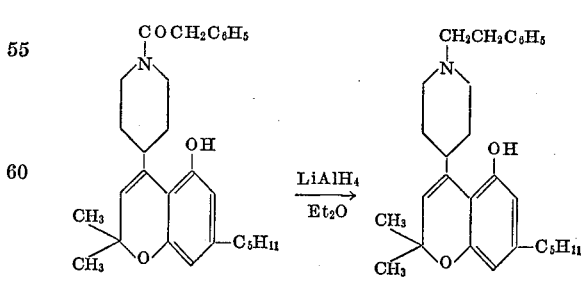

The amide (1 g.; 0.0022 mole) in 20 ml. of dry ether was added dropwise to a stirred suspension of 115 g. (0.04 mole) of lithium aluminum hydride in 25 ml. of dry ether. The mixture was refluxed for 20 hours, cooled and carefully decomposed with 10 ml. of water. The solution was filtered and the large amount of solid was washed with ether. The combined ether solution was washed with water and dried over sodium sulfate. Evaporation of the ether and trituration of the residue with acetonitrile gave 0.67 g. (69%) of a colorless solid, m.p. 133–145°. 100 mg. of the crude product was recrystallized from 3 ml. of alcohol to give 50 mg. of the phenethyl analog, m.p. 160–161°.

*Analysis.*—Calcd. for $C_{29}H_{39}NO_2$: C, 80.32; H, 9.07; N, 3.23. Found: C, 80.35; H, 9.19; N, 3.17.

(X) PREPARATION OF 4 - (1 - CYCLOPROPYL-METHYL - 4 - PIPERIDYL) - 2,2 - DIMETHYL - 7-PENTYL-2H-1-BENZOPYRAN-5-OL

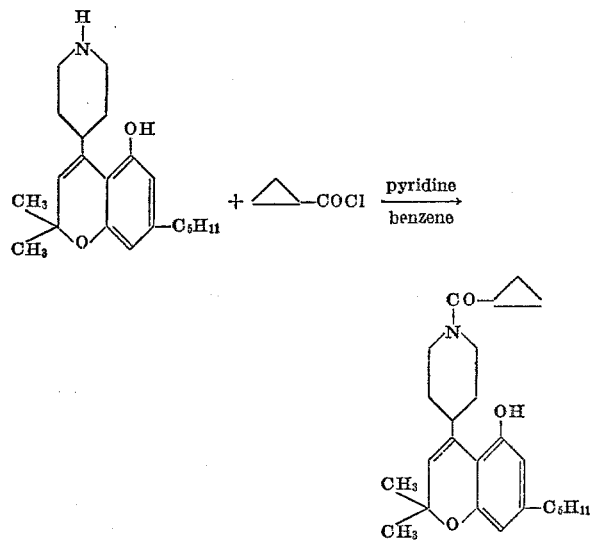

A solution of 0.47 g. (0.0045 mole) of cyclopropyl-carboxylic acid chloride in 10 ml. of dry benzene was added dropwise to 1.5 g. (0.0045 mole) of the nor base in a mixture of dry pyridine and 5 ml. of dry benzene. The mixture was refluxed for 2 hours and cooled overnight. The solution was filtered and the filtrate was evaporated to dryness. The dark, oily residue was triturated and scratched under warm water until solidification occurred. The solid was filtered and washed with water to give 1.62 g. (91%), m.p. 135–138°, of the amide.

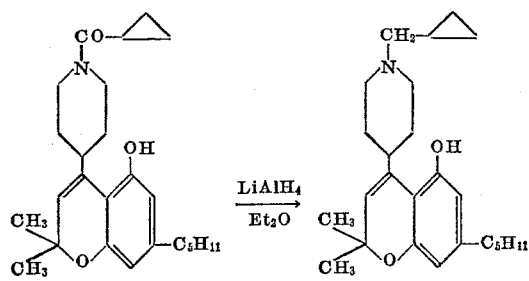

The amide in 175 ml. of dry ether was added with stirring to a mixture of 1.5 g. of lithium aluminum hydride in about 20 ml. of dry ether. The mixture was refluxed overnight and carefully decomposed with water. The ether solution was decanted and the salts washed with more ether. The ether solution was dried over sodium sulfate and evaporated to give a solid which was triturated with acetonitrile. The product was recrystallized from 10–15 ml. of acetonitrile and the near colorless crystals were filtered and washed with cold acetonitrile to yield 712 mg., m.p. 75–78°.

*Analysis.*—Calcd. for $C_{25}H_{37}NO_2$: C, 78.28; H, 9.72; N, 3.65. Found: C, 78.23; H, 9.79; N, 3.56.

The procedure is preferably carried out at an elevated temperature and the desired product is isolated and put into suitable dosage or dosage unit form ready for administration with the usual conventional carriers or vehicles. Where an acid addition salt of the pharmacodynamically active compound is desired, such can be formed by reacting the base compound with any pharmaceutically acceptable non-toxic inorganic or organic acid and where an N-oxide of the said pharmacodynamically active compound is desired, this can be readily produced by treating the base compound with hydrogen peroxide or other suitable per compound.

The coumarin compounds have the formula:

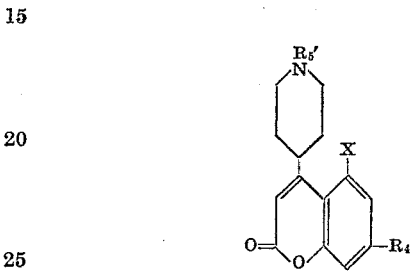

wherein $R_4$ is halogen or an aliphatic hydrocarbon having 1 to 24 carbon atoms $R'_5$ is an electron withdrawing protecting group; and X is OH or an ester or ether thereof;

and the benzopyrans produced therefrom have the formula:

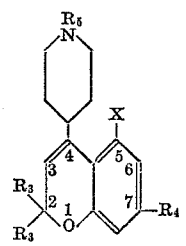

wherein $R_3$ is lower alkyl having 1 to 6 carbon atoms, $R_4$ is halogen or an aliphatic hydocarbon having 1 to 24 carbon atoms, $R_5$ is hydrogen or an electron withdrawing protecting group, and X is hydroxy or an ester or ether thereof.

In the foregoing manner the coumarin intermediates for use in the process can be readily prepared. The reaction which produces the coumarin intermediates is a condensation reaction carried out in a mixture of concentrated sulphuric acid and phosphorus oxychloride or other condensation agent such as aluminum chloride, hydrogen halide such as hydrogen chloride, hydrogen fluoride, or polyphosphoric acid.

It has been found that by following the foregoing procedure and the sequence of steps and reactions set forth the pharmacodynamically active compounds can be efficiently prepared in good yield and with high purity and has in general been found to be a particularly advantageous way to make the anti-depressant and anti-anxiety or analgesic agents.

Any of the foregoing benzopyran-5-ols can be saturated in the pyran ring as shown in the following illustrative example:

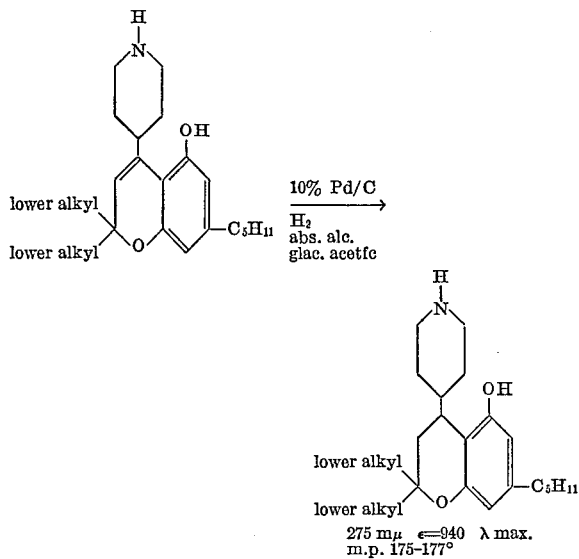

275 mμ ∈=940  λ max.
m.p. 175–177° wherein lower alkyl is usually or preferably methyl.

120 mg. of the pyran in a mixture of 20 ml. of absolute alcohol and 10 ml. of glacial acetic acid was shaken with about 200 mg. of 10% Pd/C for 27 hrs. The mixture was filtered through a filter aid and the filtrate was evaporated to dryness. The residue was recrystallized from acetonitrile to give the dihydro derivative as a colorless solid, m.p. 175–177°;

$\lambda^{275}_{max.}$ mμ, ∈=940.

There was no vinylic proton in the nmr spectrum. By carrying out the above reaction over a sufficient period of time, the conversion yield is quantitative.

What is claimed is:

1. The compound lower-alkyl-β-oxo-4-piperidine - N-benzoyl-propionate of the formula:

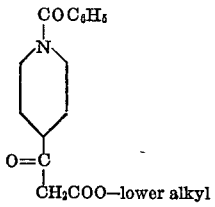

2. The compound ethyl- β -oxo-4-piperidineN-benzoyl-propionate of the formula:

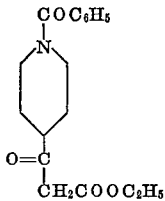

References Cited

Adams et al.: J. Am. Chem. Soc. *63*, 1971–3 (1941).
Razdan et al. Tetrahedron Lett., *1967* (35), 3405–8.
Bram et al.: Bull. Soc. Chim. France, *1964* (5), 945–51.

G. THOMAS TODD, Primary Examiner

U.S. Cl. X.R.

260—293.58; 424—267